(12) United States Patent
Zhang et al.

(10) Patent No.: US 12,199,706 B2
(45) Date of Patent: Jan. 14, 2025

(54) METHOD FOR CONTROL SIGNALING FOR MULTI-BEAM PUSCH REPETITION TRANSMISSION

(71) Applicant: Apple Inc., Cupertino, CA (US)

(72) Inventors: Yushu Zhang, Beijing (CN);
Chunxuan Ye, San Diego, CA (US);
Dawei Zhang, Saratoga, CA (US);
Haitong Sun, Cupertino, CA (US);
Hong He, San Jose, CA (US);
Oghenekome Oteri, San Diego, CA (US); Seyed Ali Akbar Fakoorian, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/911,129

(22) PCT Filed: Sep. 24, 2021

(86) PCT No.: PCT/CN2021/120267
§ 371 (c)(1),
(2) Date: Sep. 12, 2022

(87) PCT Pub. No.: WO2023/044737
PCT Pub. Date: Mar. 30, 2023

(65) Prior Publication Data
US 2024/0204832 A1    Jun. 20, 2024

(51) Int. Cl.
*H04L 1/02*        (2006.01)
*H04B 7/0456*    (2017.01)
(Continued)

(52) U.S. Cl.
CPC ....... *H04B 7/0465* (2013.01); *H04L 25/0226* (2013.01); *H04W 72/23* (2023.01)

(58) Field of Classification Search
CPC ....... H04L 1/08; H04L 1/1896; H04L 1/1893; H04L 5/0057; H04L 25/0224; H04W 72/23; H04W 72/21; H04W 72/1263; H04B 7/0408
USPC ......................... 375/267, 260, 262
See application file for complete search history.

(56) References Cited

U.S. PATENT DOCUMENTS

2023/0354205 A1*  11/2023  Khoshnevisan .... H04W 52/146
2023/0403700 A1*  12/2023  Deghel ................ H04B 7/0408
(Continued)

FOREIGN PATENT DOCUMENTS

| CN | 110858775 A  | 3/2020 |
| CN | 112690031 A  | 4/2021 |
| WO | 2020155179 A1 | 8/2020 |

OTHER PUBLICATIONS

Summary of Multi-TRP URLLC for PUCCH and PUSCH, Nokia, Nokia Shanghai Bell, 3GPP TSG RAN WG1 #103-e, R1-2009757, Oct. 26-Nov. 13, 2020, 19 pages.
(Continued)

*Primary Examiner* — Khai Tran
(74) *Attorney, Agent, or Firm* — Kilpatrick Townsend & Stockton LLP

(57) ABSTRACT

A method is provided for a base station (BS) in communication with a user equipment (UE). The UE is configured with codebook based transmission or non-codebook based transmission for multi-beam physical uplink shared channel (PUSCH) repetition. Various options are provided for the UE to derive uplink precoders for the multi-beam PUSCH repetition.

20 Claims, 9 Drawing Sheets

(51) Int. Cl.
   *H04L 25/02*     (2006.01)
   *H04W 72/23*     (2023.01)

(56) References Cited

U.S. PATENT DOCUMENTS

2023/0412238 A1* 12/2023 Tran ...................... H04W 16/28
2024/0032025 A1*  1/2024 Gao ................... H04W 72/232
2024/0114504 A1*  4/2024 Gao ................. H04W 72/1268

OTHER PUBLICATIONS

International Patent Application No. PCT/CN2021/120267, International Search Report and Written Opinion Received, Mailed on Jun. 20, 2022, 9 pages.
3rd Generation Partnership Project; Technical Specification Group Radio Access Network; NR; Multiplexing and channel coding (Release 16), 3GPP TS 38.212 V16.7.0, Sep. 2021, 153 pages.
3rd Generation Partnership Project; Technical Specification Group Radio Access Network; NR; Physical layer procedures for data (Release 16), 3GPP TS 38.214 V16.6.0, Jun. 2021, 173 pages.
International Patent Application No. PCT/CN2021/120267, International Preliminary Report on Patentability, Apr. 4, 2024, 6 pages.
On PDCCH, PUCCH and PUSCH enhancements for multi-TRP, Ericsson, 3GPP TSG-RAN WG1 Meeting #104bis-e, R1-2103550, Apr. 12-20, 2021, 30 pages.
Enhancements on Multi-TRP for PDCCH, PUCCH and PUSCH, 3GPP TSG-RAN WG1 Meeting #104b-e, R1-2102960, Apr. 12-20, 2021, 20 pages.
Moderator summary for multi-beam enhancement, Samsung, 3GPP TSG RAN WG1 #105-e, R1-2105290, May 10-27, 2021, 66 pages.

* cited by examiner

200

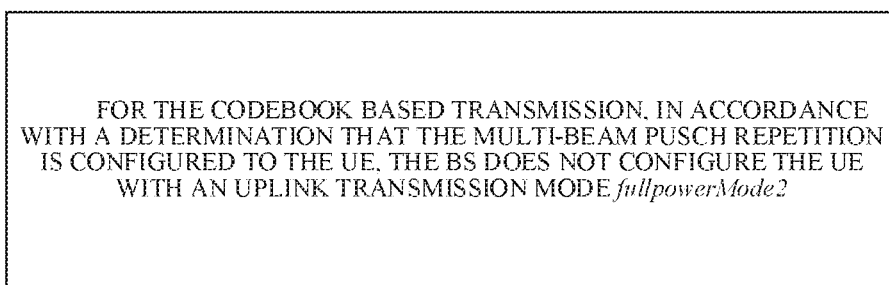

210 — FOR THE CODEBOOK BASED TRANSMISSION, IN ACCORDANCE WITH A DETERMINATION THAT THE MULTI-BEAM PUSCH REPETITION IS CONFIGURED TO THE UE, THE BS DOES NOT CONFIGURE THE UE WITH AN UPLINK TRANSMISSION MODE *fullpowerMode2*

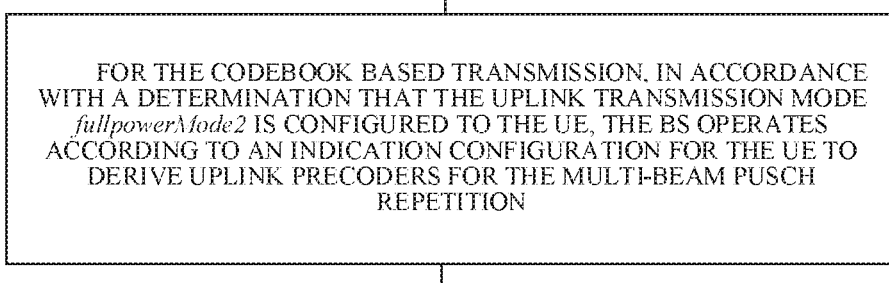

220 — FOR THE CODEBOOK BASED TRANSMISSION, IN ACCORDANCE WITH A DETERMINATION THAT THE UPLINK TRANSMISSION MODE *fullpowerMode2* IS CONFIGURED TO THE UE, THE BS OPERATES ACCORDING TO AN INDICATION CONFIGURATION FOR THE UE TO DERIVE UPLINK PRECODERS FOR THE MULTI-BEAM PUSCH REPETITION

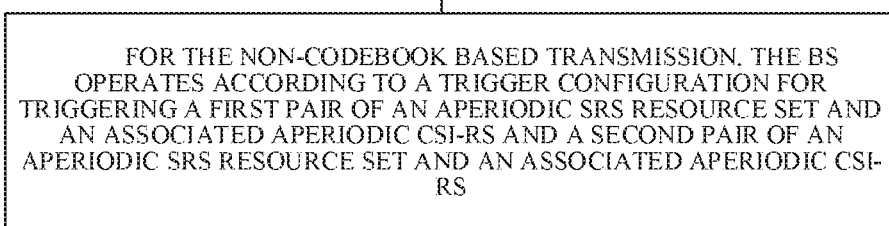

230 — FOR THE NON-CODEBOOK BASED TRANSMISSION, THE BS OPERATES ACCORDING TO A TRIGGER CONFIGURATION FOR TRIGGERING A FIRST PAIR OF AN APERIODIC SRS RESOURCE SET AND AN ASSOCIATED APERIODIC CSI-RS AND A SECOND PAIR OF AN APERIODIC SRS RESOURCE SET AND AN ASSOCIATED APERIODIC CSI-RS

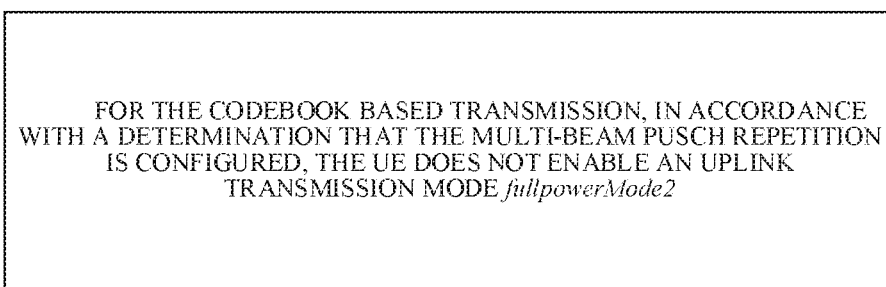

410 — FOR THE CODEBOOK BASED TRANSMISSION, IN ACCORDANCE WITH A DETERMINATION THAT THE MULTI-BEAM PUSCH REPETITION IS CONFIGURED, THE UE DOES NOT ENABLE AN UPLINK TRANSMISSION MODE *fullpowerMode2*

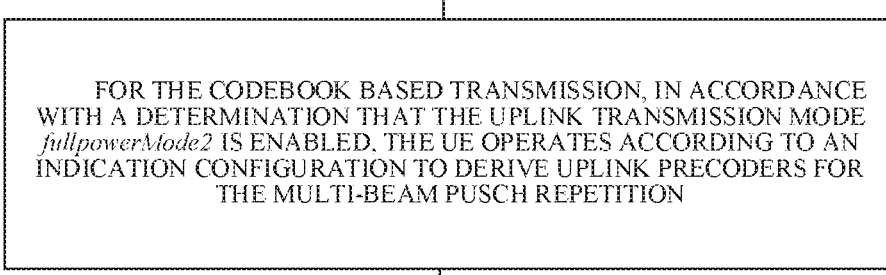

420 — FOR THE CODEBOOK BASED TRANSMISSION, IN ACCORDANCE WITH A DETERMINATION THAT THE UPLINK TRANSMISSION MODE *fullpowerMode2* IS ENABLED, THE UE OPERATES ACCORDING TO AN INDICATION CONFIGURATION TO DERIVE UPLINK PRECODERS FOR THE MULTI-BEAM PUSCH REPETITION

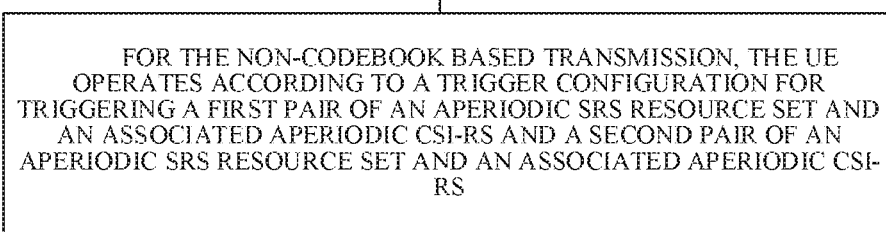

430 — FOR THE NON-CODEBOOK BASED TRANSMISSION, THE UE OPERATES ACCORDING TO A TRIGGER CONFIGURATION FOR TRIGGERING A FIRST PAIR OF AN APERIODIC SRS RESOURCE SET AND AN ASSOCIATED APERIODIC CSI-RS AND A SECOND PAIR OF AN APERIODIC SRS RESOURCE SET AND AN ASSOCIATED APERIODIC CSI-RS

*FIG. 4*

METHOD FOR CONTROL SIGNALING FOR MULTI-BEAM PUSCH REPETITION TRANSMISSION

CROSS REFERENCE TO RELATED APPLICATION

This application is a 371 U.S. National Phase of PCT International Patent Application No. PCT/CN2021/120267, filed Sep. 24, 2021, which is herein incorporated by reference in its entirety for all purposes.

TECHNICAL FIELD

The present disclosure relates to the field of wireless communication, and more specifically, to control signaling for multi-beam PUSCH repetition transmission.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to some embodiments of the present disclosure, a method for a base station (BS) in communication with a user equipment (UE) is provided. The UE is configured with codebook based transmission or non-codebook based transmission for multi-beam physical uplink shared channel (PUSCH) repetition. The method comprises: performing at least one selected from a group consisting of: for the codebook based transmission, in accordance with a determination that the multi-beam PUSCH repetition is configured to the UE, not configuring the UE with an uplink transmission mode fullpowerMode2 in which the UE is allowed to use a different number of ports for different sounding reference signal (SRS) resources for the codebook based transmission; for the codebook based transmission, in accordance with a determination that the uplink transmission mode fullpowerMode2 is configured to the UE, operating according to an indication configuration for the UE to derive uplink precoders for the multi-beam PUSCH repetition; and for the non-codebook based transmission, operating according to a trigger configuration for triggering a first pair of an aperiodic SRS resource set and an associated aperiodic channel state information reference signal (CSI-RS) and a second pair of an aperiodic SRS resource set and an associated aperiodic CSI-RS, the first and second pairs configured for the UE to derive uplink precoders for the multi-beam PUSCH repetition.

According to some embodiments of the present disclosure, a method for a user equipment (UE) in communication with a base station (BS) is provided. The UE is configured with codebook based transmission or non-codebook based transmission for multi-beam physical uplink shared channel (PUSCH) repetition. The method comprises: performing at least one selected from a group consisting of: for the codebook based transmission, in accordance with a determination that the multi-beam PUSCH repetition is configured, not enabling an uplink transmission mode fullpowerMode2 in which the UE is allowed to use different number of ports for different sounding reference signal (SRS) resources for the codebook based transmission; for the codebook based transmission, in accordance with a determination that the uplink transmission mode fullpowerMode2 is enabled, operating according to an indication configuration to derive uplink precoders for the multi-beam PUSCH repetition; and for the non-codebook based transmission, operating according to a trigger configuration for triggering a first pair of an aperiodic SRS resource set and an associated aperiodic channel state information reference signal (CSI-RS) and a second pair of an aperiodic SRS resource set and an associated aperiodic CSI-RS, the first and second pairs configured for the UE to derive uplink precoders for the multi-beam PUSCH repetition.

According to some embodiments of the present disclosure, an apparatus for a base station is provided. The apparatus comprises one or more processors configured to perform any of the methods as described above.

According to some embodiments of the present disclosure, an apparatus for a user equipment (UE) is provided. The apparatus comprises one or more processors configured to perform any of the methods as described above.

According to some embodiments of the present disclosure, an apparatus for a communication device is provided. The apparatus comprises means for performing steps of the method as describe above.

According to some embodiments of the present disclosure, a computer readable medium having computer programs stored thereon is provided. The computer programs, when executed by an apparatus having one or more processors, cause the apparatus to perform any of the methods as described above.

According to some embodiments of the present disclosure, a computer program product is provided. The computer program product comprises computer programs which, when executed by an apparatus having one or more processors, cause the apparatus to perform any of the methods as described above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 2 illustrates a schematic diagram of an example method in accordance with some embodiments.

FIG. 4 illustrates a schematic diagram of an example method in accordance with some embodiments.

DETAILED DESCRIPTION

Figure 1:
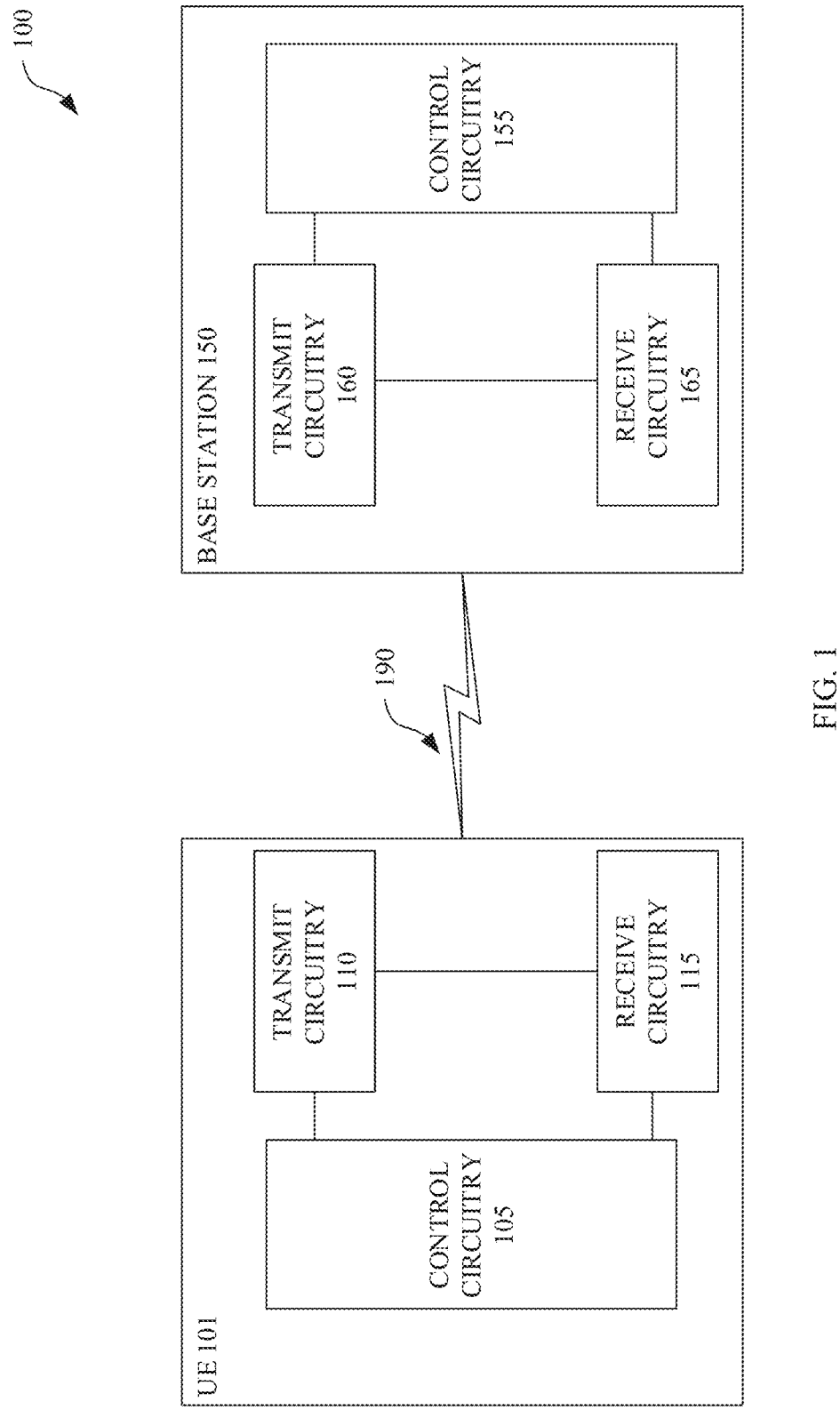
FIG. 1 is a block diagram of a system including a base station and a user equipment (UE) in accordance with some embodiments.

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE).

As used herein, the terms "user equipment" and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user. A UE may be mobile or may (e.g., at certain times) be stationary, and may communicate with a Radio Access Network (RAN).

As used herein, the term "and/or" or "at least one of" includes any and all combinations of one or more of the associated listed items.

In 3GPP Release-17, PUSCH repetitions with multi-beam operation are supported, where repetitions with different beams may be received by different transmission reception points (TRPs). The base station may configure two sounding reference signal (SRS) resource sets for codebook based uplink transmission and another two SRS resource sets for non-codebook based uplink transmission. For the codebook based transmission, the base station may indicate two SRS resource indicators (SRIs), a precoder indicator (including a first transmission precoder matrix indicator (TPMI) and a transmission rank indicator (TRI)) and a second TPMI to the UE, such that the UE can determine respective precoders for two PUSCH repetitions. For the non-codebook based transmission, the base station can provide a CSI-RS associated with an SRS resource set for the UE to derive a precoder for the SRS. In the case of multi-beam PUSCH repetition, the base station may thus trigger two aperiodic SRS resource sets and associated two CSI-RS resources, in order for the UE to derive respective precoders for two PUSCH repetitions.

In some cases, however, problems may arise with PUSCH repetitions with multi-beam operation. For example, in the case of codebook based transmission, how to indicate the SRI and the second TPMI when uplink full power mode 2 is enabled could be one problem (hereinafter "issue 1"). In the case of non-codebook based transmission, if two aperiodic SRS resource sets and two associated CSI-RS resources are triggered simultaneously, the UE behavior for aperiodic SRS transmission could be another problem (hereinafter "issue 2").

Embodiments of the present disclosure propose a solution for control signaling for multi-beam PUSCH repetition transmission, with a view to alleviating, mitigating, or eliminating at least one of the problems as identified above. Principles and implementations of the present disclosure will be described in detail below with reference to the drawings.

FIG. 1 is a block diagram of a system including a base station and a user equipment (UE) in accordance with some embodiments. FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beam-forming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

FIG. 2 illustrates a schematic diagram of an example method 200 in accordance with some embodiments. The method 200 may be performed by a base station (BS) in communication with a UE. For purposes of discussion, the method 200 will be described in conjunction with FIG. 1. For example, the base station and the UE may be the base station 150 and the UE 101 as shown in FIG. 1, respectively. The UE 101 is configured with either codebook based transmission or non-codebook based transmission for multi-beam physical uplink shared channel (PUSCH) repetition.

At block 210, the UE 101 is configured with the codebook based transmission. If the multi-beam PUSCH repetition is configured to the UE 101, the base station 150 will not enable the UE 101 to operate in an uplink transmission mode fullpowerMode2 in which the UE 101 is allowed to use a different number of antenna ports (hereinafter "ports") for different sounding reference signal (SRS) resources. Block 210 may be achieved by specifying in a 3GPP Technical Specification that the base station shall not configure both the fullpowerMode2 and multi-beam PUSCH repetition at the same time. In this case, the base station 150 may, alternatively, configure other transmission modes to the UE 101, such as fullpowerMode0 and fullpowerMode1. In one example, the uplink transmission mode fullpowerMode2 may be the full power mode 2 as defined in 3GPP 5G NR standard Release 16.

By means of the approach provided in block 210, issue 1 as identified earlier can be avoided because full power mode 2 is simply not enabled for multi-beam PUSCH repetition.

At block 220, the UE 101 is configured with the codebook based transmission. In addition, the uplink transmission mode fullpowerMode2 is also enabled for the UE 101. In this case, the base station 150 may operate according to an indication configuration. The indication configuration is for the UE 101 to derive uplink precoders for the multi-beam PUSCH repetition.

The codebook based transmission requires the base station 150 to indicate the following indicators to the UE 101:
  two SRIs associated with two SRS resource sets respectively,
  a precoder indicator, including a first TPMI and a transmission rank indicator (TRI), and
  a second TPMI.

Here, only one TRI is needed for two PUSCH repetitions because both repetitions should be transmitted based on the same number of layers (i.e., TRI). Two TPMIs and the TRI are indicated to the UE 101 such that the UE 101 can derive two precoders for the two PUSCH repetitions respectively. The first TPMI together with the TRI is used to determine a first precoder from a codebook identified by a first SRI, and the second TPMI together with the TRI is used to determine a second precoder from a codebook identified by a second SRI.

The indication configuration comprises an SRI indication associated with the two SRIs and a TPMI indication associated with the second TPMI.

In some embodiments, the SRI indication may specify that SRS resources within the two SRS resource sets are to be configured with the same number of SRS ports. For example, when the uplink transmission mode fullpowerMode2 is enabled for multi-beam PUSCH repetition, up to two SRS resources per SRS resource set can be configured for the purpose of, for example, supporting two spatial relation indication, wherein the resources across both resource sets are configured with the same number of SRS ports. It should be noted that in this case the number of SRS resources in each resource set may be different.

In some embodiments, the TPMI indication may specify that the total size (which may also be referred to as "bit width") of the second TPMI is based on a maximum number of TPMI codepoints among each rank of the precoder indicator. Additionally, the first K bits (K being a natural number) of the second TPMI respectively indicate one or more TPMI values corresponding to a rank indicated by the precoder indicator, and the remaining bits of the second TPMI may be reserved.

Take the case of 4 antenna ports and codebookSubset noncoherent as an example. According to the right-most column of Table 1 as shown below (which reproduces Table 7.3.1.1.2-2 in 3GPP TS 38.212), in the case of rank 0 (i.e., 1 layer), four TPMI codepoints (TPMI=0, 1, 2, 3) are available, which correspond to a bit width of 2 since 2 bits are needed to encode these four TPMI values. Similarly, in the case of rank 1 (i.e., 2 layers), six TPMI codepoints (TPMI=0, 1, 2, 3, 4, 5) are available, which correspond to a bit width of 3 since 3 bits are needed to encode the six TPMI values. In the case of rank 2 (i.e., 3 layers), one TPMI codepoint (TPMI-0) is available, which correspond to a bit width of 1. In the case of rank 3 (i.e., 4 layers), one TPMI codepoint (TPMI-0) is available, which correspond to a bit width of 1. Thus, the total size of the second TPMI can be determined as max{2,3,1,1}=3 bits, meaning that the indication of the second TPMI will have 23=8 entries. If the TRI indicated by the precoder indicator is 0 (i.e., TRI+1=1 layer), according to the right-most column of Table 1, four TPMI values (TPMI=0, 1, 2, 3) are available. Therefore, the indication of the second TPMI could be as {TPMI=0, TPMI=1, TPMI=2, TPMI=3, reserved, reserved, reserved, reserved}.

TABLE 1

Precoding information and number of layers, for 4 antenna ports, if transform precoder is disabled, maxRank = 2 or 3 or 4, and ul-FullPowerTransmission is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset= nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layer: TPMI = 12 | | | | |
| ... | ... | | | | |
| 47 | 1 layer: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | Reserved | | | | |

In some embodiments, the SRI indication may specify that each SRS resource within the two SRS resource sets is to be configured with a different number of SRS ports. For example, when the uplink transmission mode fullpower-Mode2 is enabled for multi-beam PUSCH repetition, a first one of the two SRS resource sets may be configured with a 1-port SRS resource, and a second one of the two SRS resource sets may be configured with a 2-port SRS resource and a 4-port SRS resource.

In such embodiments, the number of ports for two SRS resources indicated by the two SRIs may be the same. In other words, the two SRS resources, respectively indicated by the two SRIs, within the two SRS resource sets are to be configured with the same number of SRS ports. For example, if a 2-port SRS resource is indicated by the SRI indication associated with the first SRS resource set, then a 2-port SRS resource has to be indicated by the SRI associated with the second SRS resource set as well. In such embodiments, the TPMI indication as described above still applies. That is, the total size of the second TPMI is based on a maximum number of TPMI codepoints among each rank of the precoder indicator, and the first K bits of the second TPMI respectively indicate one or more TPMI values corresponding to a rank indicated by the precoder indicator, with the remaining bits reserved.

Alternatively, the number of ports for two SRS resources indicated by the two SRIs can be different. In other words, the two SRS resources that are indicated by the two SRIs and are within the two SRS resource sets respectively are to be configured with respective different numbers of SRS ports. As an option, the two SRS resource sets are to be configured with the same number of SRS resources. For example, if the first SRS resource set is configured with two SRS resources, then the second SRS resource set has to be configured with two SRS resources as well. As another option, a configured number of SRS ports for one of the two SRS resource sets is to be the same as a configured number of SRS ports for another of the two SRS resource sets. For example, if a 1-port SRS resource and a 2-port SRS resource are configured in the first SRS resource set, then a 1-port SRS resource and a 2-port SRS resource have to be configured in the second resource set as well.

Further, the TPMI indication may specify that the total size of the second TPMI is based on a maximum number of TPMI codepoints among each rank of the precoder indicators and each SRS resource within the second SRS resource set. Additionally, the first one or more bits of the second TPMI may indicate one or more TPMI values, respectively, that correspond to a rank indicated by the precoder indicator and the number of SRS ports indicated by the second SRI. The remaining bits of the second TPMI may be reserved.

For example, if the two SRS resources in the second SRS resource set are configured with 2 and 4 SRS ports respectively and codebookSubset=nonCoherent, then according to Table 2 as shown below (which reproduces Table 7.3.1.1.2-4 in 3GPP TS 38.212 and corresponds to the case of 2 ports) and Table 1 as shown above (which corresponds to the case of 4 antenna ports), the total size of the second TPMI can be determined as max{{1, 1}, {2, 3, 1, 1}}=3 bits (or equivalently 8 entries). If the TRI=0 (corresponding to 1 layer) and the second SRI=0 (corresponding to 2 ports), the indication of the second TPMI could be as {TPMI=0, TPMI=1, reserved, reserved, reserved, reserved, reserved, reserved} (note here that according to the right-most column of Table 2, there are two TPMI values (TPMI=0, 1) are available for the case of 1 layer).

TABLE 2

Precoding information and number of layers, for 2 antenna ports, if transform precoder is disabled, maxRank = 2, and ul-FullPowerTransmission is not configured or configured to fullpowerMode 2 or configured to fullpower

| Bit field mapped to index fullyAndPartialAndNonCoherent | codebookSubset = | Bit field mapped to index nonCoherent | codebookSubset = |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

At block 230, the UE 101 is configured with the non-codebook based transmission. The base station 150 operates according to a trigger configuration for triggering a first pair of an aperiodic SRS resource set and an associated aperiodic channel state information reference signal (CSI-RS) and a second pair of an aperiodic SRS resource set and an associated aperiodic CSI-RS. The first and second pairs are configured for the UE 101 to derive uplink precoders for the multi-beam PUSCH repetition.

In some embodiments (option 1), the trigger configuration may specify that the first and second pairs of aperiodic SRS resource sets and associated aperiodic CSI-RSs are not to be triggered by single downlink control information (DCI). In other words, the two pairs of aperiodic SRS resource sets and associated aperiodic CSI-RSs are not to be triggered simultaneously but triggered serially. Further options will be described below in reference to FIGS. 3A-3C.

Figure 3A:
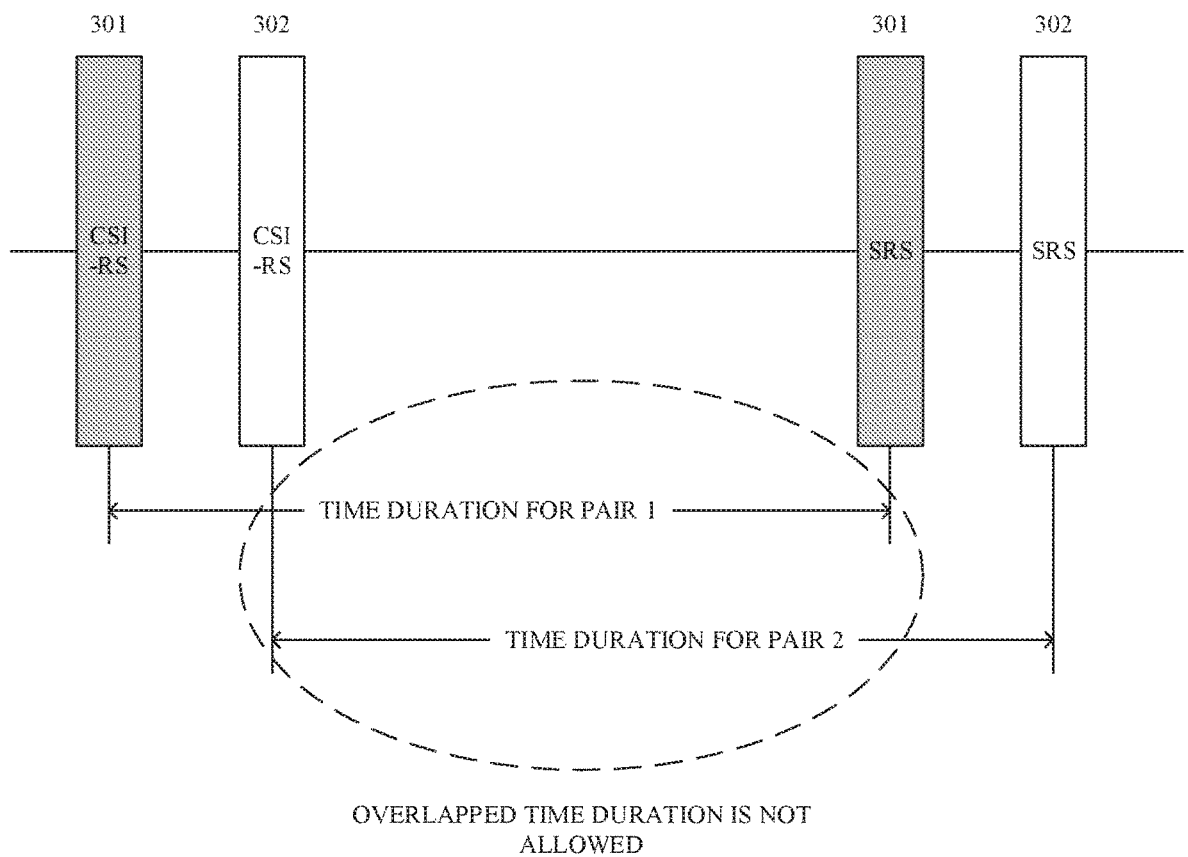
FIGS. 3A-3C illustrate schematic diagrams of SRS+CSI-RS pairs in accordance with some embodiments.
Figure 3B:
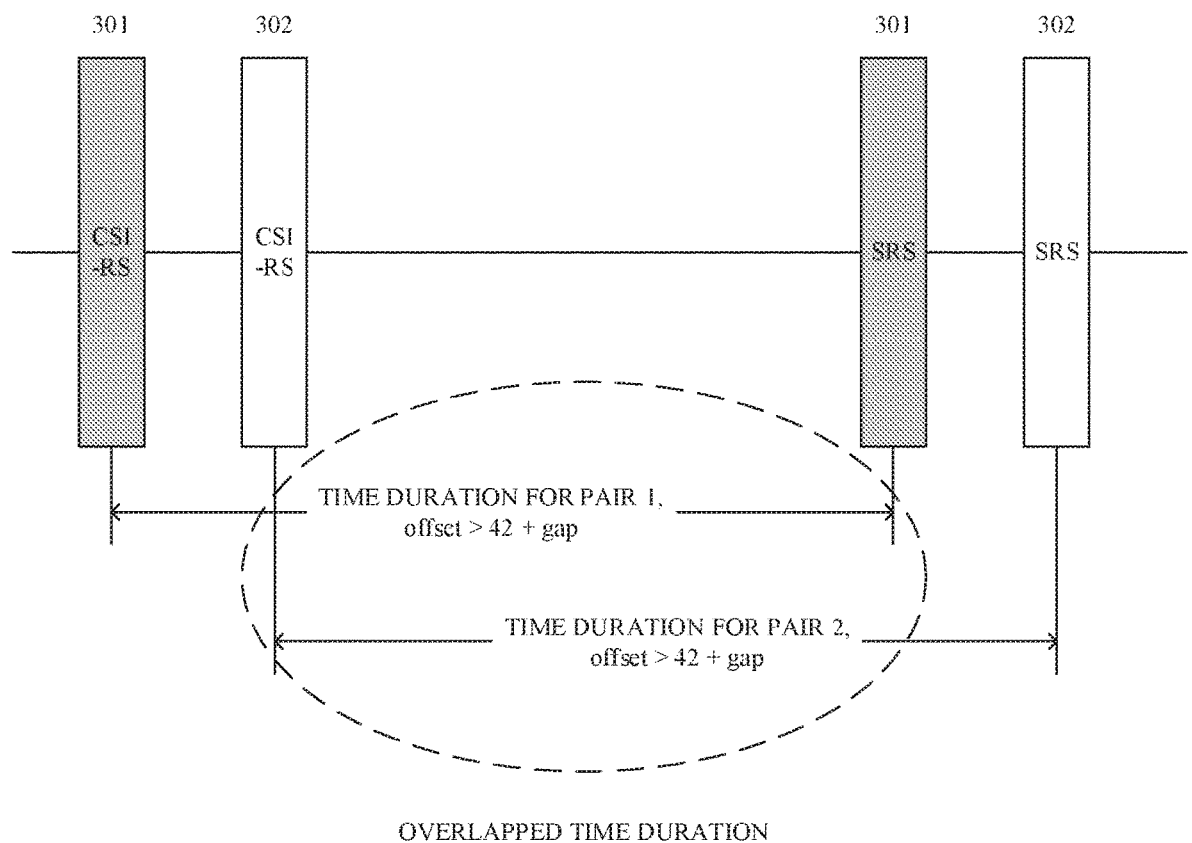
Figure 3C:
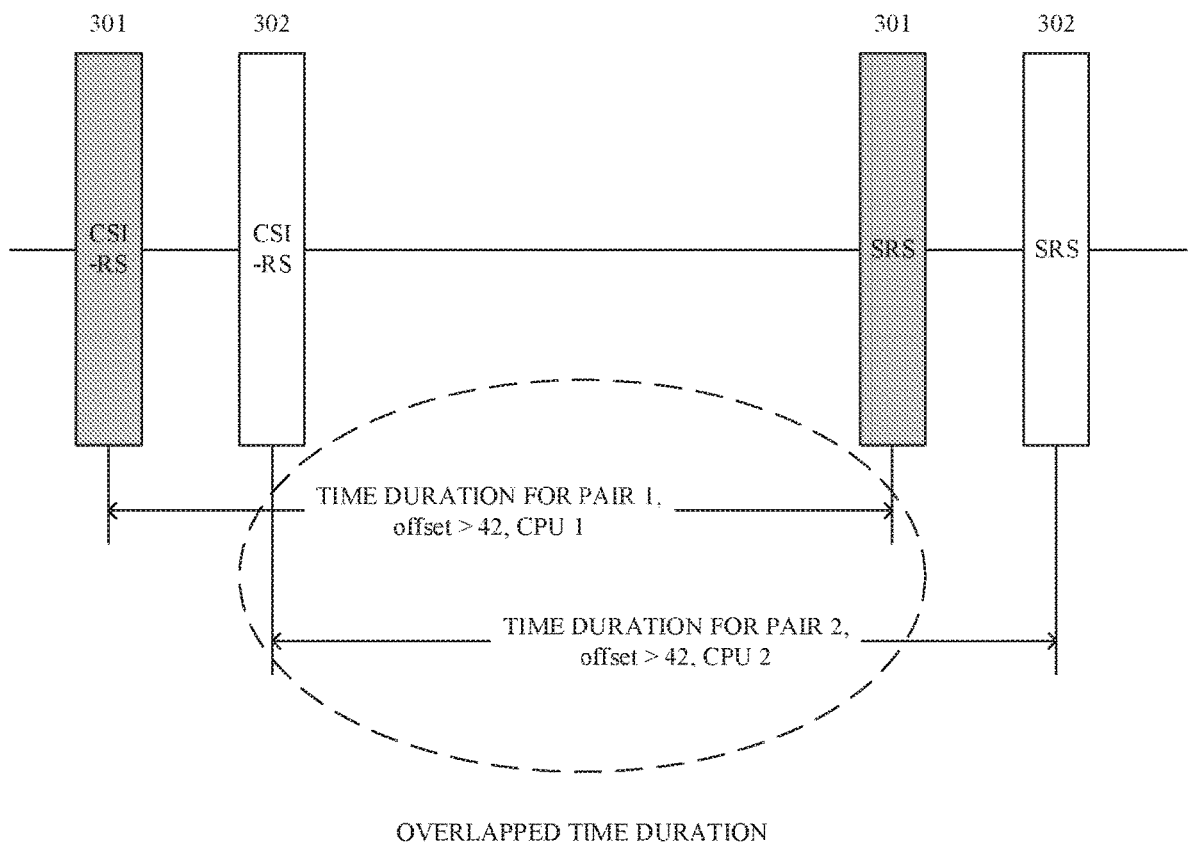

FIGS. 3A-3C illustrate schematic diagrams of SRS+CSI-RS pairs in accordance with some embodiments. As stated earlier in the opening paragraphs of the detailed description, in the case of non-codebook based transmission, if two aperiodic SRS resource sets and two associated CSI-RS resources are triggered together, the UE behavior for aperiodic SRS transmission could be a problem. Various options are provided in FIGS. 3A-3C to address this problem.

In some embodiments (option 2), as shown in FIG. 3A, the first pair 301 and second pair 302 of aperiodic SRS resource sets and associated aperiodic CSI-RSs are to be triggered without overlap in time domain. For example, the first pair 301 and the second pair 302 may be triggered simultaneously but they do not overlap in the time domain. The time duration for each pair of aperiodic SRS resource sets and associated aperiodic CSI-RS is counted from the first or the last symbol of the associated aperiodic CSI-RS to the first or the last symbol of the aperiodic SRS resource set. As indicated in FIG. 3A, an overlap between the time duration of the first pair 301 and the second pair 302 is not allowed in this option.

In some embodiments (option 3), as shown in FIG. 3B, the first pair 301 and second pair 302 of aperiodic SRS resource sets and associated aperiodic CSI-RSs are to be triggered with overlap in time domain and an additional gap in addition to a predefined minimal offset (e.g., 42 symbols) is to be provided between the associated aperiodic CSI-RS and the aperiodic SRS resource set in each of the first and second pairs. As indicated in FIG. 3B, the offset between the associated aperiodic CSI-RS and the aperiodic SRS resource set in each pair may be configured as a value larger than 42+gap. The additional gap enables the UE 101 to process the PUSCH repetitions. In some embodiments, the additional gap may be predefined in a 3GPP Technical Specification. Alternatively, the additional gap may be determined by the base station 150 based on the UE capability reported by the UE 101. In some embodiments, the length of additional gap depends on how many symbols are overlapped between the time durations of the two pairs of aperiodic SRS resource sets and associated aperiodic CSI-RSs or on the UE capability. For example, the more symbols overlapped, the longer the additional gap.

In some embodiments (option 4), as shown in FIG. 3C, the first 301 and second 302 pairs of aperiodic SRS resource sets and associated aperiodic CSI-RSs are to be triggered with overlap in time domain, and no additional gap in addition to a predefined minimal offset is required between the associated aperiodic CSI-RS and the aperiodic SRS resource set in each of the first and second pairs 301 and 302. In some implementations, the trigger configuration specifies that the UE 101 is to provide two CSI processing units (CPUs) for processing the first and second pairs 301 and 302. In this way, the first and second pairs 301 and 302 may be processed by the UE 101 in parallel with different CPUs. The CPU may be as defined in 3GPP TS 38.214, Section 5.2.1.6. A CPU is occupied during the time duration from the first or the last symbol of the associated aperiodic CSI-RS to the first or the last symbol of the aperiodic SRS resource set.

In the wireless network 100 of FIG. 1, there may be various UEs 101 that exist although only one UE is shown for clarity of illustration. Some of the UEs 101 may have a capability of parallel processing while some of the UEs 101 may have not. Thus, whether the options 2, 3 and 4 as described above with reference to FIGS. 3A-3C are to be supported by the UE 101 can be determined based on the UE capability. If the UE 101 reports that it is capable of supporting both the options 3 and 4, the base station 150 may indicate to the UE 101 whether to use option 3 or 4 by higher layer signaling, e.g., RRC signaling. Alternatively, whether to use option 3 or 4 may be determined by whether the first and second pairs 301 and 302 are triggered by the same DCI or different DCI. For example, if the UE 101 is capable of supporting both the options 3 and 4 and the two pairs of aperiodic SRS resource sets and associated aperiodic CSI-RSs are triggered by the same DCI, then option 4 may be used. Alternatively, if the UE 101 is capable of supporting both the options 3 and 4 and the two pairs of aperiodic SRS resource sets and associated aperiodic CSI-RSs are triggered by different DCI, then option 3 may be used. It will be understood that the examples are given only for purposes of illustration and do not limit the present disclosure.

FIG. 4 illustrates a schematic diagram of an example method 400 in accordance with some embodiments. The method 400 is performed by a UE in communication with a base station. Blocks 410, 420 and 430 are equivalent to blocks 210, 220 and 230 as shown in FIG. 2 except that the blocks 410, 420 and 430 are performed by the UE instead of the base station.

At block 410, in the case of codebook based transmission, the UE is configured with multi-beam PUSCH repetition and will not be configured with the uplink transmission mode fullpowerMode2.

At block 420, in the case of codebook based transmission, the UE is configured with the uplink transmission mode fullpowerMode2, and operates according to an indication configuration to derive uplink precoders for the multi-beam PUSCH repetition. Details of the indication configuration have been discussed above with reference to FIGS. 2 and 3 and will not be repeated here for conciseness.

At block 430, in the case of non-codebook based transmission, the UE operates according to a trigger configuration for triggering a first pair of an aperiodic SRS resource set and an associated aperiodic channel state information reference signal (CSI-RS) and a second pair of an aperiodic SRS resource set and an associated aperiodic CSI-RS. The first and second pairs are configured for the UE to derive uplink precoders for the multi-beam PUSCH repetition. Details of the trigger configuration have been discussed above with reference to FIGS. 2 and 3 and will not be repeated here for conciseness.

Figure 5:
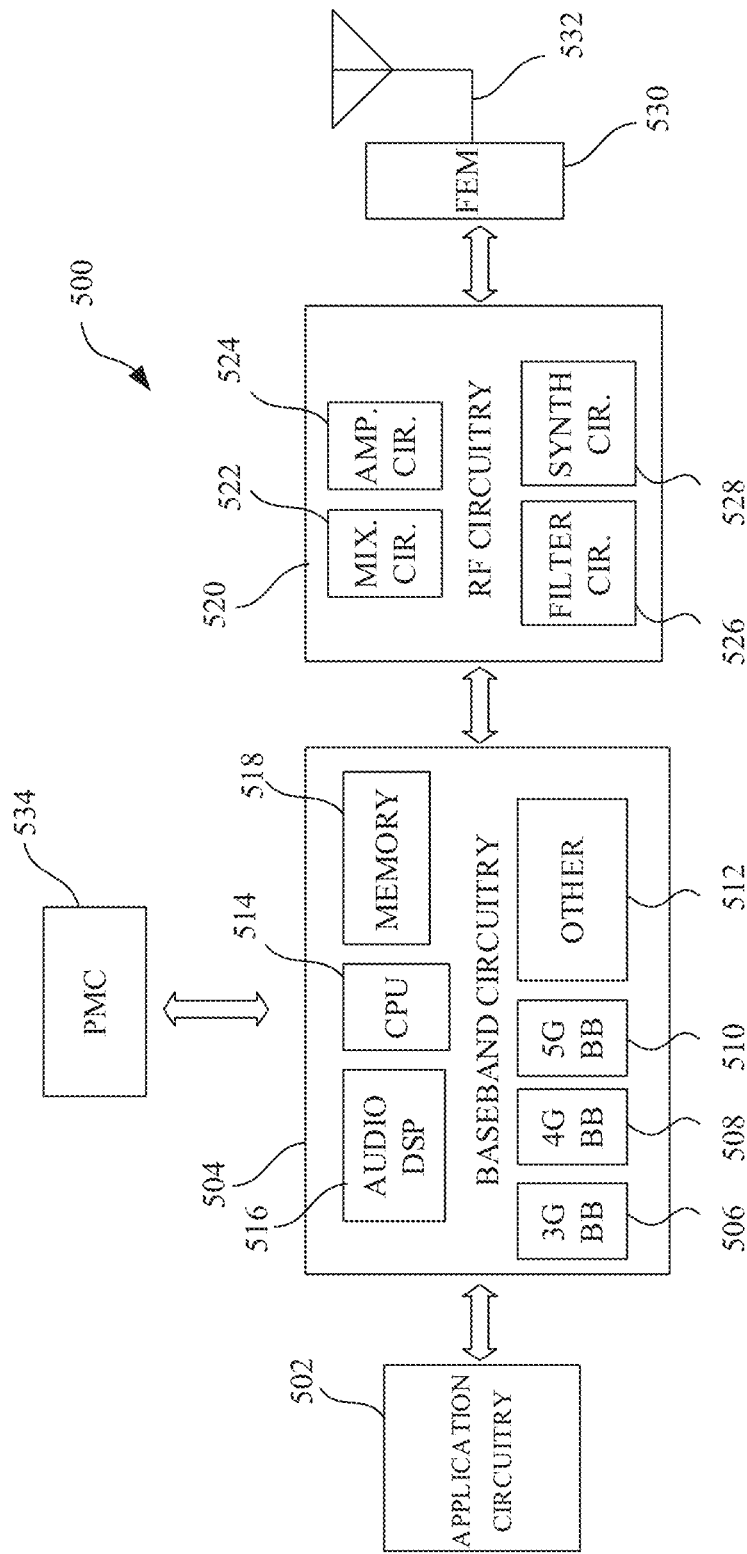
FIG. 5 is a block diagram illustrating a communication device (e.g., a UE or a base station) in accordance with some embodiments.

FIG. 5 illustrates example components of a device 500 in accordance with some embodiments. In some embodiments, the device 500 may include application circuitry 502, baseband circuitry 504, Radio Frequency (RF) circuitry (shown as RF circuitry 520), front-end module (FEM) circuitry (shown as FEM circuitry 530), one or more antennas 532, and power management circuitry (PMC) (shown as PMC 534) coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 520 and to generate baseband signals for a transmit signal path of the RF circuitry 520. The baseband circuitry 504 may interface with the application circuitry 502 for generation and processing of the baseband signals and for controlling operations of the RF circuitry 520. For example, in some embodiments, the baseband circuitry 504 may include a third generation (3G) baseband processor (3G baseband processor 506), a fourth generation (4G) baseband processor (4G baseband processor 508), a fifth generation (5G) baseband processor (5G baseband processor 510), or other baseband processor(s) 512 for other existing generations, generations in development or to be developed in the future (e.g., second generation (2G), sixth generation (6G), etc.). The baseband circuitry 504 (e.g., one or more of baseband processors) may handle various radio control functions that enable communication with one or more radio networks via the RF circuitry 520. In other embodiments, some or all of the functionality of the illustrated baseband processors may be included in modules stored in the memory 518 and executed via a Central Processing ETnit (CPET 514). The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include a digital signal processor (DSP), such as one or more audio DSP(s) 516. The one or more audio DSP(s) 516 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 504 is configured to support radio communications of more than one wireless protocol may be referred to as multi-mode baseband circuitry.

The RF circuitry 520 may enable communication with wireless networks using modulated electromagnetic radiation through a non-solid medium. In various embodiments, the RF circuitry 520 may include switches, filters, amplifiers, etc. to facilitate the communication with the wireless network. The RF circuitry 520 may include a receive signal path which may include circuitry to down-convert RF signals received from the FEM circuitry 530 and provide baseband signals to the baseband circuitry 504. The RF circuitry 520 may also include a transmit signal path which may include circuitry to up-convert baseband signals provided by the baseband circuitry 504 and provide RF output signals to the FEM circuitry 530 for transmission.

In some embodiments, the receive signal path of the RF circuitry 520 may include mixer circuitry 522, amplifier circuitry 524 and filter circuitry 526. In some embodiments, the transmit signal path of the RF circuitry 520 may include filter circuitry 526 and mixer circuitry 522. The RF circuitry 520 may also include synthesizer circuitry 528 for synthesizing a frequency for use by the mixer circuitry 522 of the receive signal path and the transmit signal path. In some embodiments, the mixer circuitry 522 of the receive signal path may be configured to down-convert RF signals received from the FEM circuitry 530 based on the synthesized frequency provided by synthesizer circuitry 528. The amplifier circuitry 524 may be configured to amplify the down-converted signals and the filter circuitry 526 may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, the mixer circuitry 522 of the receive signal path may include passive mixers, although the scope of the embodiments is not limited in this respect.

In some embodiments, the mixer circuitry 522 of the transmit signal path may be configured to up-convert input baseband signals based on the synthesized frequency provided by the synthesizer circuitry 528 to generate RF output signals for the FEM circuitry 530. The baseband signals may be provided by the baseband circuitry 504 and may be filtered by the filter circuitry 526.

In some embodiments, the mixer circuitry 522 of the receive signal path and the mixer circuitry 522 of the transmit signal path may include two or more mixers and may be arranged for quadrature downconversion and upconversion, respectively. In some embodiments, the mixer circuitry 522 of the receive signal path and the mixer circuitry 522 of the transmit signal path may include two or more mixers and may be arranged for image rejection (e.g., Hartley image rejection). In some embodiments, the mixer circuitry 522 of the receive signal path and the mixer circuitry 522 may be arranged for direct downconversion and direct upconversion, respectively. In some embodiments, the mixer circuitry 522 of the receive signal path and the mixer circuitry 522 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 520 may include analog-to-digital converter (ADC) and digital-to-analog converter (DAC) circuitry and the baseband circuitry 504 may include a digital baseband interface to communicate with the RF circuitry 520.

In some dual-mode embodiments, a separate radio IC circuitry may be provided for processing signals for each spectrum, although the scope of the embodiments is not limited in this respect.

In some embodiments, the synthesizer circuitry 528 may be a fractional –N synthesizer or a fractional N/N+1 synthesizer, although the scope of the embodiments is not limited in this respect as other types of frequency synthesizers may be suitable. For example, synthesizer circuitry 528 may be a delta-sigma synthesizer, a frequency multiplier, or a synthesizer including a phase-locked loop with a frequency divider.

The synthesizer circuitry 528 may be configured to synthesize an output frequency for use by the mixer circuitry 522 of the RF circuitry 520 based on a frequency input and a divider control input. In some embodiments, the synthesizer circuitry 528 may be a fractional N/N+1 synthesizer.

In some embodiments, frequency input may be provided by a voltage controlled oscillator (VCO), although that is not a requirement. Divider control input may be provided by either the baseband circuitry 504 or the application circuitry 502 (such as an applications processor) depending on the desired output frequency. In some embodiments, a divider control input (e.g., N) may be determined from a look-up table based on a channel indicated by the application circuitry 502.

Synthesizer circuitry 528 of the RF circuitry 520 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 528 may be configured to generate a carrier frequency as the output frequency, while in other embodiments, the output frequency may be a multiple of the carrier frequency (e.g., twice the carrier frequency, four times the carrier frequency) and used in conjunction with a quadrature generator and divider circuitry to generate multiple signals at the carrier frequency with multiple different phases with respect to each other. In some embodiments, the output frequency may be an LO frequency (fLO). In some embodiments, the RF circuitry 520 may include an IQ/polar converter.

The FEM circuitry 530 may include a receive signal path which may include circuitry configured to operate on RF signals received from one or more antennas 532, amplify the received signals and provide the amplified versions of the received signals to the RF circuitry 520 for further processing. The FEM circuitry 530 may also include a transmit signal path which may include circuitry configured to amplify signals for transmission provided by the RF circuitry 520 for transmission by one or more of the one or more antennas 532. In various embodiments, the amplification through the transmit or receive signal paths may be done solely in the RF circuitry 520, solely in the FEM circuitry 530, or in both the RF circuitry 520 and the FEM circuitry 530.

In some embodiments, the FEM circuitry 530 may include a TX/RX switch to switch between transmit mode and receive mode operation. The FEM circuitry 530 may include a receive signal path and a transmit signal path. The receive signal path of the FEM circuitry 530 may include an LNA to amplify received RF signals and provide the amplified received RF signals as an output (e.g., to the RF circuitry 520). The transmit signal path of the FEM circuitry 530 may include a power amplifier (PA) to amplify input RF signals (e.g., provided by the RF circuitry 520), and one or more filters to generate RF signals for subsequent transmission (e.g., by one or more of the one or more antennas 532).

In some embodiments, the PMC 534 may manage power provided to the baseband circuitry 504. In particular, the PMC 534 may control power-source selection, voltage scaling, battery charging, or DC-to-DC conversion. The PMC 534 may often be included when the device 500 is capable of being powered by a battery, for example, when the device 500 is included in an EGE. The PMC 534 may increase the power conversion efficiency while providing desirable implementation size and heat dissipation characteristics.

FIG. 5 shows the PMC 534 coupled only with the baseband circuitry 504. However, in other embodiments, the PMC 534 may be additionally or alternatively coupled with, and perform similar power management operations for, other components such as, but not limited to, the application circuitry 502, the RF circuitry 520, or the FEM circuitry 530.

In some embodiments, the PMC 534 may control, or otherwise be part of, various power saving mechanisms of the device 500. For example, if the device 500 is in an RRC Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 6:
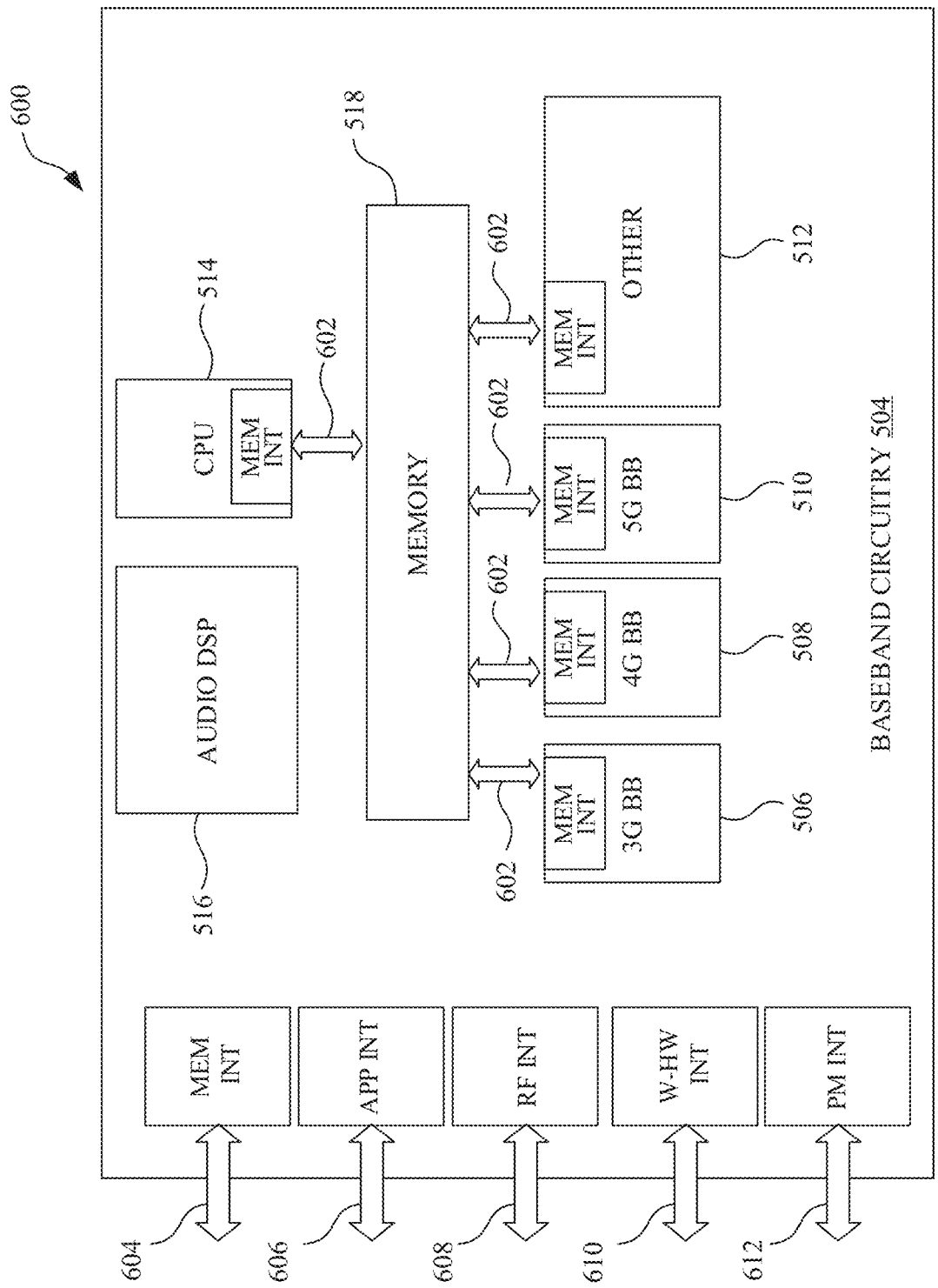
FIG. 6 illustrates example interfaces of baseband circuitry in accordance with some embodiments.

FIG. 6 illustrates example interfaces 600 of baseband circuitry in accordance with some embodiments. As discussed above, the baseband circuitry 504 of FIG. 5 may include 3G baseband processor 506, 4G baseband processor 508, 5G baseband processor 510, other baseband processor(s) 512, CPU 514, and a memory 518 utilized by said processors. As illustrated, each of the processors may include a respective memory interface 602 to send/receive data to/from the memory 518.

The baseband circuitry 504 may further include one or more interfaces to communicatively couple to other circuitries/devices, such as a memory interface 604 (e.g., an interface to send/receive data to/from memory external to the baseband circuitry 504), an application circuitry interface 606 (e.g., an interface to send/receive data to/from the application circuitry 502 of FIG. 5), an RF circuitry interface 608 (e.g., an interface to send/receive data to/from RF circuitry 520 of FIG. 5), a wireless hardware connectivity interface 610 (e.g., an interface to send/receive data to/from Near Field Communication (NFC) components, Bluetooth® components (e.g., Bluetooth® Low Energy), Wi-Fi® components, and other communication components), and a power management interface 612 (e.g., an interface to send/receive power or control signals to/from the PMC 534.

Figure 7:
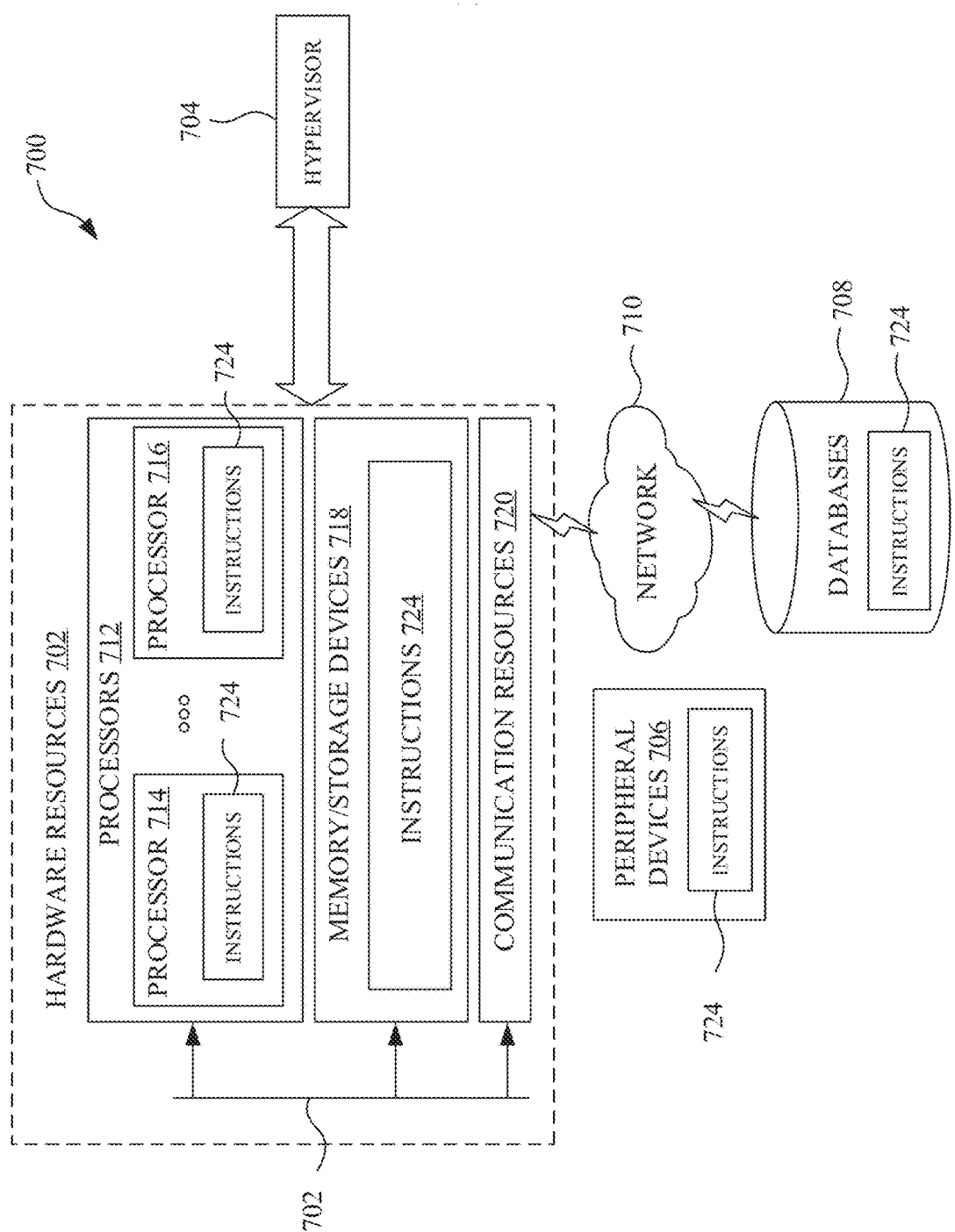
FIG. 7 illustrates components in accordance with some embodiments.

FIG. 7 is a block diagram illustrating components 700, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 702 including one or more processors 712 (or processor cores), one or more memory/storage devices 718, and one or more communication resources 720, each of which may be communicatively coupled via a bus 722. For embodiments where node virtualization (e.g., NFV) is utilized, a hypervisor 704 may be executed to provide an execution environment for one or more network slices/sub-slices to utilize the hardware resources 702.

The processors 712 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 714 and a processor 716.

The memory/storage devices 718 may include main memory, disk storage, or any suitable combination thereof. The memory/storage devices 718 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 720 may include interconnection or network interface components or other suitable devices to communicate with one or more peripheral devices 706 or one or more databases 708 via a network 710. For example, the communication resources 720 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 724 may include software, a program, an application, an applet, an app, or other executable code for causing at least any of the processors 712 to perform any one or more of the methodologies discussed herein. The instructions 724 may reside, completely or partially, within at least one of the processors 712 (e.g., within the processor's cache memory), the memory/storage devices 718, or any suitable combination thereof. Furthermore, any portion of the instructions 724 may be transferred to the hardware resources 702 from any combination of the peripheral devices 706 or the databases 708. Accordingly, the memory of the processors 712, the memory/storage devices 718, the peripheral devices 706, and the databases 708 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a base station (BS) in communication with a user equipment (UE), wherein the UE is configured with codebook based transmission or non-codebook based transmission for multi-beam physical uplink shared channel (PUSCH) repetition, the method comprising: performing at least one selected from a group consisting of: for the codebook based transmission, in accordance with a determination that the multi-beam PUSCH repetition is configured to the UE, not configuring the UE with an uplink transmission mode fullpowerMode2 in which the UE is allowed to use a different number of ports for different sounding reference signal (SRS) resources for the codebook based transmission; for the codebook based transmission, in accordance with a determination that the uplink transmission mode fullpowerMode2 is configured to the UE, operating according to an indication configuration for the UE to derive uplink precoders for the multi-beam PUSCH repetition; and for the non-codebook based transmission, operating according to a trigger configuration for triggering a first pair of an aperiodic SRS resource set and an associated aperiodic channel state information reference signal (CSI-RS) and a second pair of an aperiodic SRS resource set and an associated aperiodic CSI-RS, the first and second pairs configured for the UE to derive uplink precoders for the multi-beam PUSCH repetition.

Example 2 is the method of example 1, wherein for the multi-beam PUSCH repetition, the codebook based transmission requires the BS to indicate, to the UE, two SRS resource indicators (SRIs) associated with two SRS resource sets respectively, a precoder indicator including a first transmission precoder matrix indicator (TPMI) and a transmission rank indicator (TRI), and a second TPMI, and wherein the indication configuration comprises an SRI indication associated with the two SRIs and a TPMI indication associated with the second TPMI.

Example 3 is the method of example 2, wherein the SRI indication specifies that SRS resources within the two SRS resource sets are to be configured with a same number of SRS ports.

Example 4 is the method of example 2, wherein the SRI indication specifies that each SRS resource within the two SRS resource sets is to be configured with a different number of SRS ports.

Example 5 is the method of example 4, wherein the SRI indication specifies that two SRS resources, respectively indicated by the two SRIs, within the two SRS resource sets are to be configured with a same number of SRS ports.

Example 6 is the method of example 4, wherein the SRI indication specifies that two SRS resources, respectively indicated by the two SRIs, within the two SRS resource sets are to be configured with respective different numbers of SRS ports.

Example 7 is the method of example 6, wherein the SRI indication specifies that the two SRS resource sets are to be configured with a same number of SRS resources.

Example 8 is the method of example 6, wherein the SRI indication specifies that a configured number of SRS ports for one of the two SRS resource sets is to be same as a configured number of SRS ports for another of the two SRS resource sets.

Example 9 is the method of example 3 or 5, wherein the TPMI indication specifies that: a total size of the second TPMI is based on a maximum number of TPMI codepoints among each rank of the precoder indicator, and first one or more bits of the second TPMI respectively indicate one or more TPMI values corresponding to a rank indicated by the precoder indicator, and remaining bits of the second TPMI are reserved.

Example 10 is the method of any of examples 6 to 8, wherein the two SRIs comprise first and second SRIs associated with first and second SRS resource sets of the two SRS resource sets respectively, and wherein the TPMI indication specifies that: a total size of the second TPMI is based on a maximum number of TPMI codepoints among each rank of the precoder indicator and each SRS resource within the second SRS resource set, and first one or more bits of the second TPMI respectively indicate one or more TPMI values that correspond to a rank indicated by the precoder indicator and a number of SRS ports indicated by the second SRI, and remaining bits of the second TPMI are reserved.

Example 11 is the method of example 1, wherein the trigger configuration comprises at least one of: a first option to specify that the first and second pairs are not to be triggered by single downlink control information (DCI), a second option to specify that the first and second pairs are to be triggered without overlap in time domain, a third option to specify that the first and second pairs are to be triggered with overlap in time domain, and that an additional gap in addition to a predefined minimal offset is to be provided between the associated aperiodic CSI-RS and the aperiodic SRS resource set in each of the first and second pairs, a fourth option to specify that the first and second pairs are to be triggered with overlap in time domain, and that no additional gap in addition to a predefined minimal offset is to be provided between the associated aperiodic CSI-RS and the aperiodic SRS resource set in each of the first and second pairs, or a fifth option to specify that whether the second to fourth options are to be supported by the UE is determined based on a UE capability reported by the UE, and that if the UE supports both the third and fourth options, whether to use the third or fourth option is to be configured by higher layer signaling or determined by whether the first and second pairs are triggered by same DCI or different DCI.

Example 12 is the method of example 11, wherein for the third option, the additional gap is predefined.

Example 13 is the method of example 11, wherein for the third option, the additional gap is determined based on the UE capability or number of symbols overlapped between time durations of the first and second pairs of aperiodic SRS resource sets and associated aperiodic CSI-RSs.

Example 14 is the method of claim 13, wherein a time duration for each pair of aperiodic SRS resource sets and associated aperiodic CSI-RSs is from a first or last symbol of the associated aperiodic CSI-RS to a first or last symbol of the aperiodic SRS resource set.

Example 15 is the method of example 11, wherein, for the fourth option, the trigger configuration specifies that the UE is to provide two CSI processing units (CPUs) for processing the first and second pairs, wherein a respective one of the two CPUs is occupied during a time duration for each pair of aperiodic SRS resource sets and associated aperiodic CSI-RSs.

Example 16 is the method of any of examples 1 to 15, wherein the uplink transmission mode fullpowerMode2 is defined in 3GPP 5G NR standard Release 16.

Example 17 is a method for a user equipment (UE) in communication with a base station (BS), wherein the UE is configured with codebook based transmission or non-codebook based transmission for multi-beam physical uplink shared channel (PUSCH) repetition, the method comprising: performing at least one selected from a group consisting of: for the codebook based transmission, in accordance with a determination that the multi-beam PUSCH repetition is configured, not enabling an uplink transmission mode fullpowerMode2 in which the UE is allowed to use a different number of ports for different sounding reference signal (SRS) resources for the codebook based transmission; for the codebook based transmission, in accordance with a determination that the uplink transmission mode fullpowerMode2 is enabled, operating according to an indication configuration to derive uplink precoders for the multi-beam PUSCH repetition; and for the non-codebook based transmission, operating according to a trigger configuration for triggering a first pair of an aperiodic SRS resource set and an associated aperiodic channel state information reference signal (CSI-RS) and a second pair of an aperiodic SRS resource set and an associated aperiodic CSI-RS, the first and second pairs configured for the UE to derive uplink precoders for the multi-beam PUSCH repetition.

Example 18 is the method of example 17, wherein for the multi-beam PUSCH repetition, the codebook based transmission requires the BS to indicate, to the UE, two SRS resource indicators (SRIs) associated with two SRS resource sets respectively, a precoder indicator including a first transmission precoder matrix indicator (TPMI) and a transmission rank indicator (TRI), and a second TPMI, and wherein the indication configuration comprises an SRI indication associated with the two SRIs and a TPMI indication associated with the second TPMI.

Example 19 is the method of example 18, wherein the SRI indication specifies that SRS resources within the two SRS resource sets are to be configured with a same number of SRS ports.

Example 20 is the method of example 18, wherein the SRI indication specifies that each SRS resource within the two SRS resource sets is to be configured with a different number of SRS ports.

Example 21 is the method of example 20, wherein the SRI indication specifies that two SRS resources, respectively indicated by the two SRIs, within the two SRS resource sets are to be configured with a same number of SRS ports.

Example 22 is the method of example 20, wherein the SRI indication specifies that two SRS resources, respectively indicated by the two SRIs, within the two SRS resource sets are to be configured with respective different numbers of SRS ports.

Example 23 is the method of example 22, wherein the SRI indication specifies that the two SRS resource sets are to be configured with a same number of SRS resources.

Example 24 is the method of example 22, wherein the SRI indication specifies that a configured number of SRS ports for one of the two SRS resource sets is to be the same as a configured number of SRS ports for another of the two SRS resource sets.

Example 25 is the method of example 3 or 5, wherein the TPMI indication specifies that: a total size of the second TPMI is based on a maximum number of TPMI codepoints among each rank of the precoder indicator, and first one or more bits of the second TPMI respectively indicate one or more TPMI values corresponding to a rank indicated by the precoder indicator, and remaining bits of the second TPMI are reserved.

Example 26 is the method of any of examples 22 to 24, wherein the two SRIs comprise first and second SRIs associated with first and second SRS resource sets of the two SRS resource sets respectively, and wherein the TPMI indication specifies that: a total size of the second TPMI is based on a maximum number of TPMI codepoints among each rank of the precoder indicator and each SRS resource within the second SRS resource set, and first one or more bits of the second TPMI respectively indicate one or more TPMI values that correspond to a rank indicated by the precoder indicator and a number of SRS ports indicated by the second SRI, and remaining bits of the second TPMI are reserved.

Example 27 is the method of any of examples 17 to 26, wherein the trigger configuration comprises at least one of: a first option to specify that the first and second pairs are not to be triggered by single downlink control information (DCI), a second option to specify that the first and second pairs are to be triggered without overlap in time domain, a third option to specify that the first and second pairs are to be triggered with overlap in time domain, and that an additional gap in addition to a predefined minimal offset is to be provided between the associated aperiodic CSI-RS and the aperiodic SRS resource set in each of the first and second pairs, a fourth option to specify that the first and second pairs are to be triggered with overlap in time domain, and that no additional gap in addition to a predefined minimal offset is to be provided between the associated aperiodic CSI-RS and the aperiodic SRS resource set in each of the first and second pairs, or a fifth option to specify that whether the second to fourth options are to be supported by the UE is determined based on a UE capability reported by the UE, and that if the UE supports both the third and fourth options, whether to use the third or fourth option is to be configured by higher layer signaling or determined by whether the first and second pairs are triggered by same DCI or different DCI.

Example 28 is the method of example 27, wherein for the third option, the additional gap is predefined.

Example 29 is the method of example 27, wherein for the third option, the additional gap is determined based on the UE capability or number of symbols overlapped between time durations of the first and second pairs of aperiodic SRS resource sets and associated aperiodic CSI-RSs.

Example 30 is the method of example 29, wherein a time duration for each pair of aperiodic SRS resource sets and associated aperiodic CSI-RSs is from a first or last symbol of the associated aperiodic CSI-RS to a first or last symbol of the aperiodic SRS resource set.

Example 31 is the method of example 27, wherein for the fourth option, the trigger configuration specifies that the UE is to provide two CSI processing units (CPUs) for processing the first and second pairs, wherein a respective one of the two CPUs is occupied during a time duration for each pair of aperiodic SRS resource sets and associated aperiodic CSI-RSs.

Example 32 is the method of any of examples 17 to 31, wherein the uplink transmission mode fullpowerMode2 is defined in 3GPP 5G NR standard Release 16.

Example 33 is an apparatus for a base station, the apparatus comprising one or more processors configured to perform the method of any of examples 1 to 16.

Example 34 is an apparatus for a user equipment (UE), the apparatus comprising one or more processors configured to perform the method of any of examples 17 to 32.

Example 35 is an apparatus for a communication device, comprising means for
performing the method of any of examples 1 to 32.

Example 36 is a computer readable medium having computer programs stored thereon which, when executed by an apparatus having one or more processors, cause the apparatus to perform the method of any of examples 1 to 32.

Example 37 is a computer program product comprising computer programs which, when executed by an apparatus having one or more processors, cause the apparatus to perform the method of any of examples 1 to 32.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method comprising:
generating information to configure a user equipment (UE) with a plurality of sounding reference signal (SRS) resources;
identifying a first SRS resource indicator (SRI) to indicate a first SRS resource of the plurality of SRS resources, wherein the first SRS resource is configured with a first number of SRS ports;
determining a second SRS resource has to be selected from at least one SRS resource of the plurality of SRS resources that is configured with the first number of SRS ports;
selecting the second SRS resource from the at least one SRS resource;
identifying a second SRI to indicate the second SRS resource; and
generating downlink control information (DCI) to be transmitted to the UE to schedule transmission of a plurality of physical uplink shared channel (PUSCH) repetitions, the DCI to include the first SRI and the second SRI, wherein the first SRS resource is associated with a first PUSCH repetition of the plurality of PUSCH repetitions and the second SRS resource is associated with a second PUSCH repetition of the plurality of PUSCH repetitions.

2. The method of claim 1, further comprising:
configuring the UE for a codebook-based transmission of the plurality of PUSCH repetitions to at least two transmission-reception points (TRPs).

3. The method of claim 1, further comprising:
enabling the UE for an uplink full power mode 2 transmission mode.

4. The method of claim 3, wherein the plurality of SRS resources include a first plurality of SRS resources associated with a first SRS resource set and a second plurality of SRS resources associated with a second SRS resource set.

5. The method of claim 4, wherein the first plurality of SRS resources includes the first SRS resource and the second plurality of SRS resources includes the second SRS resource.

6. The method of claim 4, wherein the second plurality of SRS resources includes at least two SRS resources having a different number of SRS ports.

7. The method of claim 4, wherein the first plurality of SRS resources includes a same number of resources as the second plurality of SRS resources.

8. The method of claim 4, wherein a common number of SRS ports are configured for the first SRS resource set and the second SRS resource set.

9. The method of claim 1, wherein the DCI further includes a transmission rank indicator to indicate a number of layers on which both the first PUSCH repetition and the second PUSCH repetition are to be transmitted.

10. The method of claim 1, wherein the DCI further includes a first transmission precoding matrix indicator (TPMI) to indicate a first precoder to be used to transmit the first PUSCH repetition and a second TPMI to indicate a second precoder to be used to transmit the second PUSCH repetition.

11. One or more non-transitory, computer-readable media having instructions that, when executed, cause one or more processors to:

receive a configuration of a plurality of sounding reference signal (SRS) resources;

receive downlink control information (DCI) that schedules transmission of a plurality of physical uplink shared channel (PUSCH) repetitions, the DCI to include: a first SRS resource indicator (SRI) to indicate a first SRS resource of the plurality of SRS resources, wherein the first SRS resource is configured with a first number of SRS ports, the first SRS resource associated with a first PUSCH repetition of the plurality of PUSCH repetitions; and a second SRI to indicate a second SRS resource of the plurality of SRS resources, wherein the one or more processors are to determine the second SRS resource has to include the first number of SRS ports, the second SRS resource associated with a second PUSCH repetition of the plurality of PUSCH repetitions; and select a first precoder for the first PUSCH repetition and a second precoder for the second PUSCH repetition based on the DCI.

12. The one or more non-transitory, computer-readable media of claim 11, wherein the instructions, when executed, further cause the one or more processors to:

receive a configuration for a codebook-based transmission of the plurality of PUSCH repetitions to at least two transmit-receive points (TRPs).

13. The one or more non-transitory, computer-readable media of claim 11, wherein the instructions, when executed, further cause the one or more processors to:

enable an uplink full power mode 2 transmission mode.

14. The one or more non-transitory, computer-readable media of claim 13, wherein the plurality of SRS resources include a first plurality of SRS resources associated with a first SRS resource set and a second plurality of SRS resources associated with a second SRS resource set.

15. The one or more non-transitory, computer-readable media of claim 14, wherein the first plurality of SRS resources includes the first SRS resource and the second plurality of SRS resources includes the second SRS resource.

16. The one or more non-transitory, computer-readable media of claim 14, wherein the second plurality of SRS resources includes at least two SRS resources having a different number of SRS ports.

17. The one or more non-transitory, computer-readable media of claim 14, wherein the first plurality of SRS resources includes a same number of resources as the second plurality of SRS resources.

18. The one or more non-transitory, computer-readable media of claim 14, wherein a common number of SRS ports are configured for the first SRS resource set and the second SRS resource set.

19. The one or more non-transitory, computer-readable media of claim 11, wherein the DCI further includes a transmission rank indicator to indicate a number of layers on which both the first PUSCH repetition and the second PUSCH repetition are to be transmitted.

20. The one or more non-transitory, computer-readable media of claim 6, wherein the DCI further includes a first transmission precoding matrix indicator (TPMI) to indicate the first precoder to be used to transmit the first PUSCH repetition and a second TPMI to indicate a second precoder to be used to transmit the second PUSCH repetition.

* * * * *